United States Patent
Bae et al.

(10) Patent No.: US 6,958,891 B2
(45) Date of Patent: Oct. 25, 2005

(54) ACTUATOR LOADING/UNLOADING DEVICE FOR DISC DRIVE

(75) Inventors: Byoung-young Bae, Kyungki-do (KR); Soon-kyo Hong, Seoul (KR); Chul-woo Lee, Kyungki-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 211 days.

(21) Appl. No.: 09/978,923

(22) Filed: Oct. 18, 2001

(65) Prior Publication Data

US 2002/0067685 A1 Jun. 6, 2002

(30) Foreign Application Priority Data

Dec. 5, 2000  (KR) ..................................... P2000-73474

(51) Int. Cl.$^7$ .............................................. G11B 21/12
(52) U.S. Cl. ................................. 360/254.3; 360/256.2
(58) Field of Search .......................... 360/254.3, 254.4, 360/254.6, 256, 256.2, 256.3, 255.2

(56) References Cited

U.S. PATENT DOCUMENTS

| | | | | |
|---|---|---|---|---|
| 5,329,504 A | * | 7/1994 | Mukawa .................. | 369/13.21 |
| 5,394,281 A | * | 2/1995 | Kajitani .................... | 360/254.8 |
| 5,590,095 A | * | 12/1996 | Chaya ...................... | 369/13.17 |
| 5,764,437 A | * | 6/1998 | Meyer et al. ............. | 360/254.3 |
| 5,812,345 A | * | 9/1998 | MacPherson et al. .... | 360/256.3 |
| 5,825,576 A | * | 10/1998 | Kamerbeek .................. | 360/75 |
| 5,973,887 A | * | 10/1999 | Cameron ................. | 360/254.8 |
| 5,992,848 A | * | 11/1999 | Krutsch et al. ......... | 273/127 R |
| 6,028,745 A | * | 2/2000 | Nguyen et al. .......... | 360/254.3 |
| 6,088,193 A | * | 7/2000 | Misso et al. ............. | 360/256.2 |
| 6,115,214 A | * | 9/2000 | Allsup et al. ............ | 360/254.3 |
| 6,212,045 B1 | * | 4/2001 | Guzik ..................... | 360/255.2 |
| 6,215,628 B1 | * | 4/2001 | Boutaghou ............... | 360/256.4 |
| 6,373,666 B2 | * | 4/2002 | Iida et al. ................ | 360/254.7 |
| 6,487,050 B1 | * | 11/2002 | Liu ......................... | 360/254.8 |
| 2001/0033459 A1 | * | 10/2001 | Boutaghou ............... | 360/254.3 |

FOREIGN PATENT DOCUMENTS

| | | |
|---|---|---|
| JP | 59-125765 | 7/1984 |
| JP | 61-158668 | 7/1986 |
| JP | 03-097173 | 4/1991 |
| JP | 3-122878 | 5/1991 |
| JP | 5-225737 | 9/1993 |
| JP | 5-234298 | 9/1993 |

* cited by examiner

Primary Examiner—Brian E. Miller
(74) Attorney, Agent, or Firm—Stein, McEwen & Bui, LLP

(57) ABSTRACT

An actuator loading/unloading device includes a block unit disposed at a base of a disc drive to be positioned outside a disc, a lamp member positioned on the block unit so that the lamp member is lifted from or lowered down on the block unit, an actuator being parked on the loading/unloading device by constraining a side end portion of a swing arm of the actuator during loading/unloading of the actuator, a stopper to restrict a lifting range of the lamp member, and a lifting/lowering unit to lift or lower the lamp member between the block unit and the stopper. The lifting/lowering unit includes a magnet inserted into a bottom surface of the lamp member, and an electromagnet inserted into a top surface of the block unit, facing the magnet. As a result, the actuator is stably parked on the disc drive having a compact structure where the actuator cannot be completely escaped from the disc during unloading of the actuator.

12 Claims, 5 Drawing Sheets

ACTUATOR LOADING/UNLOADING DEVICE FOR DISC DRIVE

CROSS-REFERENCE TO RELATED APPLICATIONS

This application claims the benefit of Korean Application No. 2000-73474, filed Dec. 5, 2000, in the Korean Industrial Property Office, the disclosure of which is incorporated herein by reference.

BACKGROUND OF THE INVENTION

1. Field of the Invention

The present invention relates to a disc drive used as an auxiliary memory device for a computer, and in particular, to an actuator loading/unloading device for a disc drive which can fly an optical or magnetic head on a disc for recording/reproducing information.

2. Description of the Related Art

In general, among the disc drives for recording/reproducing information, a hard disc drive is used as an auxiliary memory device for a personal computer. As is publicly known, the hard disc drive utilizes a magnetic recording principle of recording/reproducing wanted information by moving a magnetic head in a radial direction of a disc coated with a magnetic material. Hard disc drives now require increased memory capacity and miniaturization, and thus employ an optical recording/reproducing method, instead of the magnetic recording method.

FIG. 1 is a schematic view illustrating a general hard disc drive 11 in a state where its upper cover (not shown) is opened. Referring to FIG. 1, a ring magnetic disc 10 is mounted on a rotation shaft 110 of a spindle motor (not shown) disposed on a base 100, so that the magnetic disc 10 can be rotated at a high speed. An actuator 130 having a magnetic head (h) at its end portion is provided near the disc 10, so that the actuator 130 can be rotated around a pivot shaft (p) due to the driving of a voice coil motor 120. Accordingly, the actuator 130 flies the magnetic head (h) along a signal surface track (not shown) of the disc 10, thereby reproducing data recorded on the disc 10 or recording new data thereon.

The actuator 130 includes a swing arm 131 connected to the pivot shaft (p), and a plate-spring type suspension 132 disposed at the swing arm 131. The magnetic head (h) is provided to an end portion of the suspension 132.

The magnetic head (h) is floated on the disc 10 at a predetermined height due to an air flow generated by high speed rotation of the disc 10 during the driving of the hard disc drive 11. Here, the magnetic head (h) is moved on the disc 10 by moving the actuator 130 inwardly to the disc 10. When the disc 10 is stopped, the magnetic head (h) is parked on an actuator loading/unloading device 200 by moving the actuator 130 outwardly from the disc 10.

As illustrated in FIG. 2, the actuator loading/unloading device 200 includes a tap 133 downwardly protruded at the end portion of the actuator 130, and a ramp member 210 where the tap 133 is slid. The ramp member 210 has a gradually-sloped surface from an entrance direction of the tap 133. At an entrance end portion of the ramp member 210, the actuator 130 is substantially parallel to the disc 10. However, the tap 133 is moved along the sloped surface of the ramp member 210 during the unloading of the actuator 130, and thus the suspension 132 is vertically displaced. Therefore, the conventional actuator loading/unloading device 200 for the hard disc drive 11 cannot be employed in a compact structure where the actuator 130 can be completely escaped from the disc 10.

This is especially true when the optical recording/reproducing method is used instead of the magnetic recording device, because various optical units are provided to the actuator 130, thus increasing a volume of the actuator 130. Accordingly, the actuator 130 cannot be completely escaped from the disc 10 during the unloading operation. In addition, when the tap 133 is positioned on the ramp member 210 during the unloading of the actuator 130, the head (h) may contact the disc 10 due to an external vibration or impact, thereby damaging the disc 10.

SUMMARY OF THE INVENTION

Accordingly, it is an object of the present invention to provide an actuator loading/unloading device for a disc drive which can be used for a disc drive having a compact structure where an actuator cannot be completely escaped from a disc during an unloading operation.

Additional objects and advantages will be set forth in part in the description which follows, and, in part, will be obvious from the description, or may be learned by practice of the invention.

The foregoing objects of the present invention are achieved by providing an actuator loading/unloading device for a disc drive, including a block unit disposed at a base of the disc drive to be positioned outside a disc; a ramp member being positioned on the block unit so that the ramp member can be lifted or lowered on the block unit, the ramp member parking an actuator by constraining a side end portion of a swing arm of the actuator during the loading/unloading operation; a stopper to restrict a lifting range of the ramp member; and a lifting/lowering unit to lift and lower the ramp member between the block unit and the stopper.

Here, the lifting/lowering unit includes a magnet inserted into a bottom surface of the ramp member; and an electromagnet inserted into the a surface of the block unit, facing the magnet.

In another embodiment of the present invention, the lifting/lowering unit further includes a spring positioned between the stopper and the ramp member, to elastically bias the ramp member towards the block unit; and an iron strip passing through a center portion of the electromagnet, and being positioned on the block unit, facing the magnet. A locking hook is protruded toward the disc in the ramp member in order to constrain the side end portion of the swing arm in the unloading operation.

According to the present invention, the ramp member is lifted or lowered, thereby constraining the actuator. As a result, although the actuator is not completely escaped from the disc during the unloading operation, the actuator can be sufficiently separated from the disc, thereby embodying a compact structure of the disc drive.

BRIEF DESCRIPTION OF THE DRAWINGS

These and other objects and advantages of the invention will become apparent and more readily appreciated from the following description of the preferred embodiments, taken in conjunction with the accompanying drawings, of which.

DESCRIPTION OF THE PREFERRED EMBODIMENTS

Figure 1:
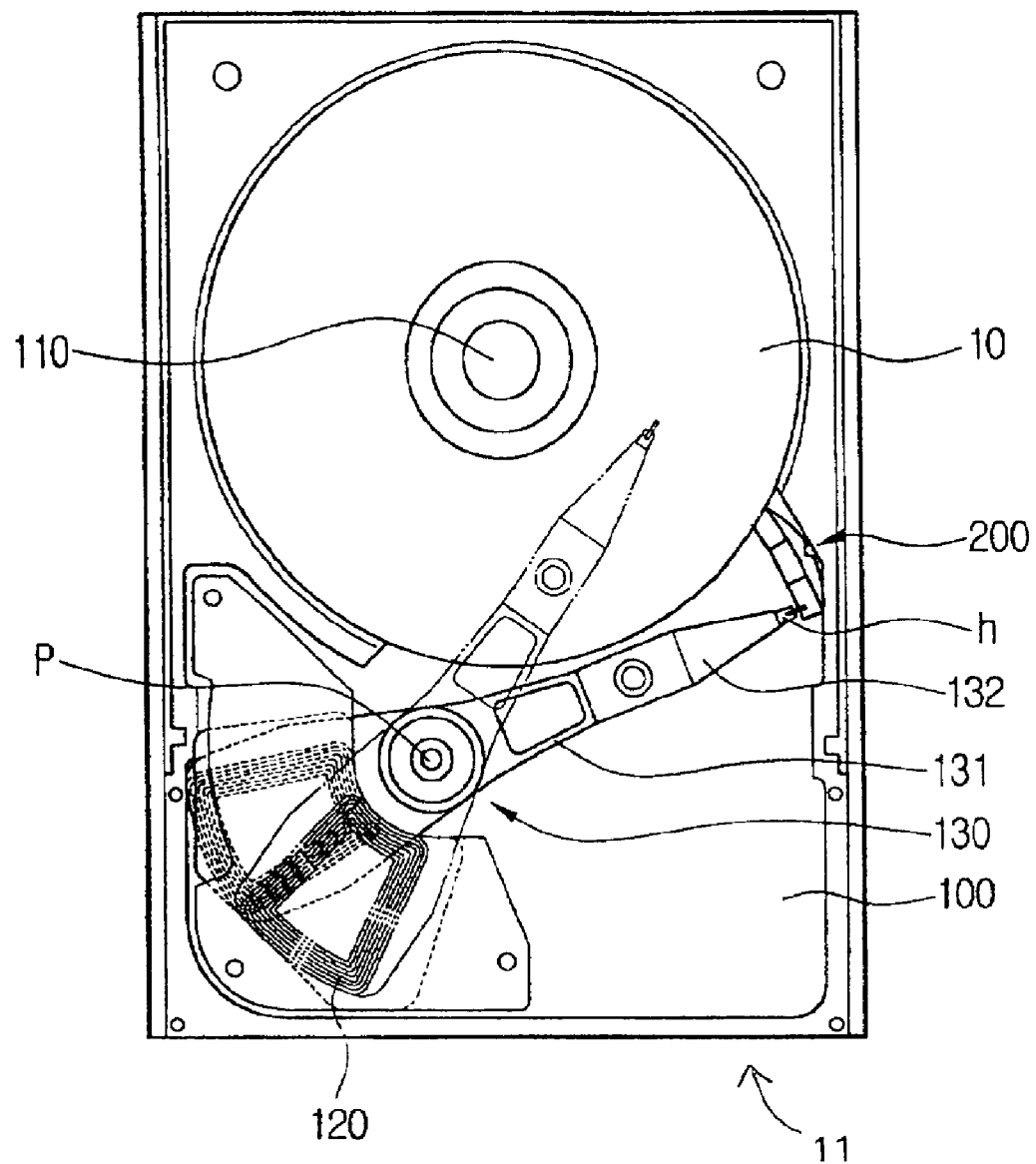
FIG. 1 is a schematic plan view illustrating a conventional hard disc drive in a state where its cover is opened.
Figure 2:
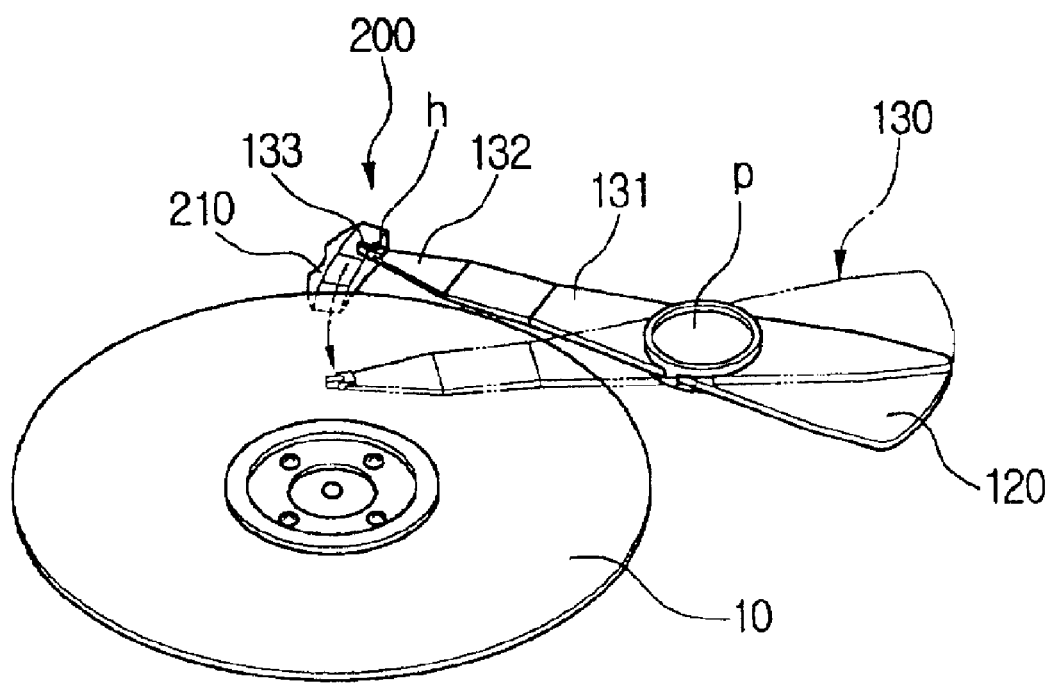
FIG. 2 is a schematic perspective view illustrating portions of the hard disc drive of FIG. 1.

Reference will now be made in detail to the present preferred embodiments of the present invention, examples of which are illustrated in the accompanying drawings, wherein like reference numerals refer to like elements throughout.

Figure 3:
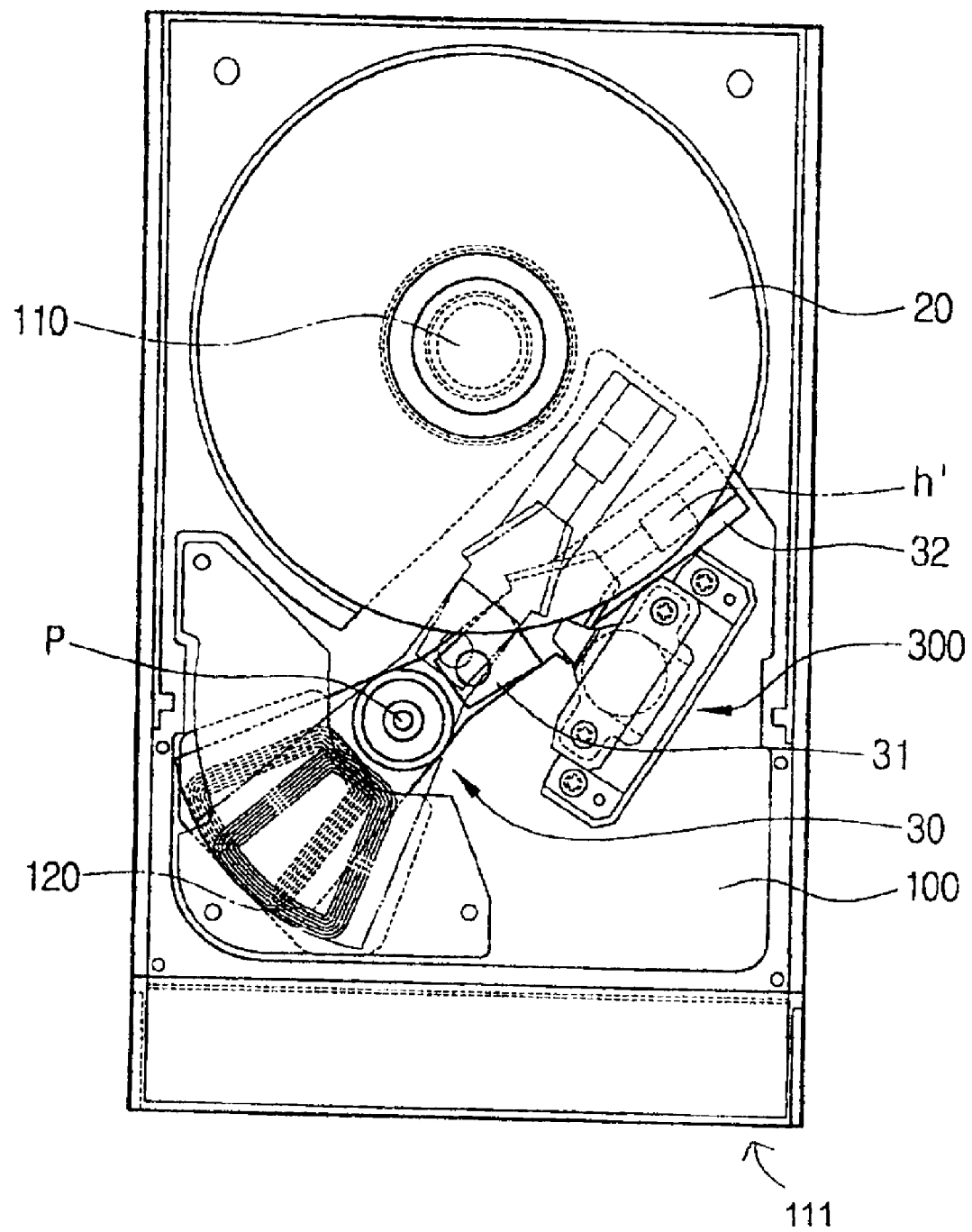
FIG. 3 is a schematic plan view illustrating a hard disc drive using an actuator loading/unloading device in accordance with the present invention, in a state where its cover is opened.

Referring to FIG. 3, the hard disc drive 111 using the actuator loading/unloading device utilizes an optical recording/reproducing method. Here, an optical disc 20 is mounted on a rotation shaft 110 of a spindle motor (not shown) disposed on a base 100, so that the optical disc 20 can be rotated at a high speed. In addition, an actuator 30 having an optical head (h') at its end portion is provided near the disc 20, so that the actuator 30 can be rotated around a pivot shaft (p') due to the driving of a voice coil motor 120.

The actuator 30 includes a swing arm 31 connected to the pivot shaft (p'), and a flexure 32 disposed on the swing arm 31. The optical head (h') is provided on the end portion of the flexure 32.

According to the movement of the actuator 30, the optical head (h') is loaded/unloaded to/from the disc 20. In the unloading operation, the optical head (h') is parked on an actuator loading/unloading device 300 by moving the actuator 30 outwardly from the disc 20.

Figure 4A:
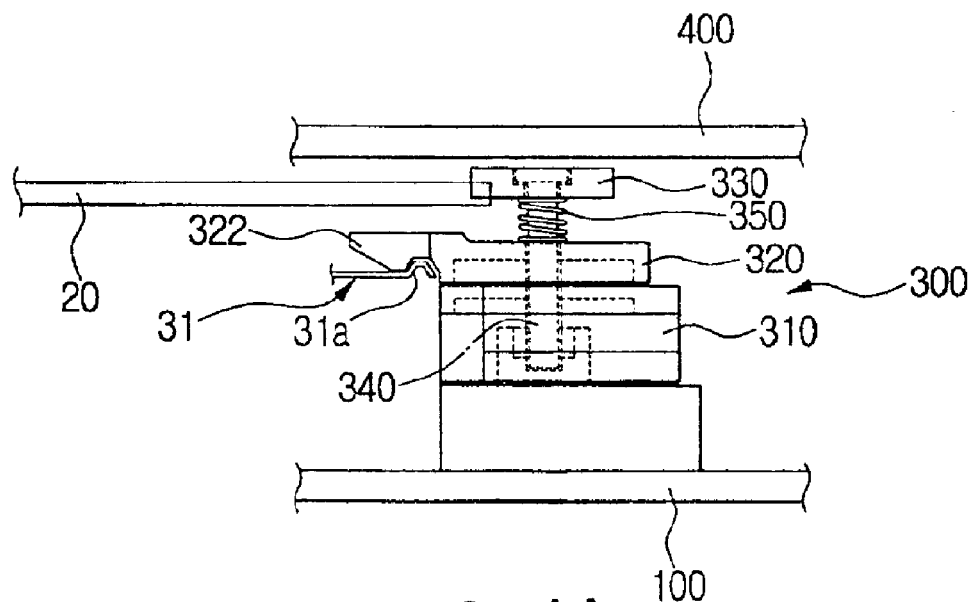
FIG. 4A is a schematic front view illustrating the actuator loading/unloading device in the unloading operation in accordance with an embodiment of the present invention.
Figure 4B:
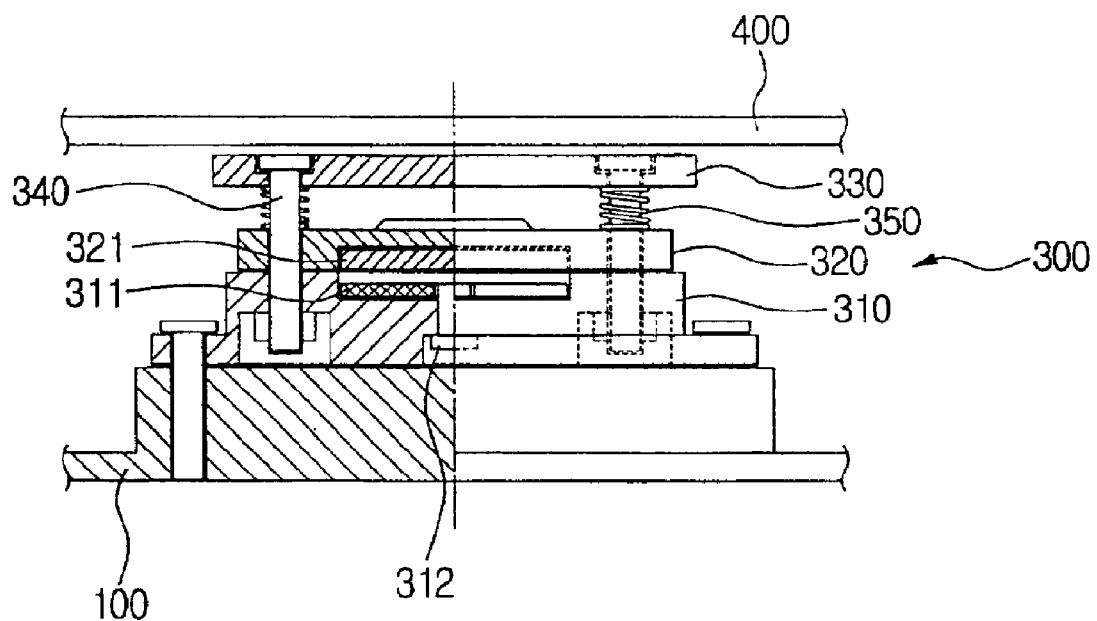
FIG. 4B is a schematic side view illustrating the actuator loading/unloading device shown in FIG. 4A.

As illustrated in FIGS. 4A and 4B, the actuator loading/unloading device 300 includes a block unit 310 disposed on the base 100 to be positioned outside the disc 20, a ramp member 320 being positioned on the block unit 310 so that the ramp member 320 can be lifted or lowered on the block unit 310, a stopper 330 positioned on the ramp member 320, to restrict a lifting range of the ramp member 320, and a lifting/lowering unit to lift or lower the ramp member 320 between the block unit 310 and the stopper 330.

Here, the lifting/lowering unit includes a permanent magnet 321 inserted into a bottom surface of the ramp member 320, and an electromagnet 311 inserted into a top surface of the block unit 310, facing the permanent magnet 321. Preferably, the block unit 310 further includes a pin-shaped iron strip 312 passing through the center portion of the electromagnet 311, and facing the permanent magnet 321. It is noted that other types of magnets, for example, a second electromagnet, may be used in place of the permanent magnet 321.

In the lifting/lowering operation, the ramp member 320 is guided by a pair of guide rods 340 having their ends fixed to the stopper 330 and the block unit 310. A compression coil spring 350 to elastically bias the ramp member 320 toward the block unit 310 is positioned between the stopper 330 and the ramp member 320. In addition, a locking hook 322 is protruded toward the disc 20 from the ramp member 320, and a protrusion unit 31a is formed at the side end portion of the swing arm 31. In the unloading of the actuator 30, the protrusion unit 31a of the swing arm 31 is hooked on the locking hook 322. Reference numeral 400 denotes a cover of the hard disc drive 111.

The operation of the actuator loading/unloading device 300 for the hard disc drive 111 in accordance with the present invention will now be explained. Referring to FIGS. 4A and 4B, when the hard disc drive 111 is not driven, the ramp member 320 is adjacent to the block unit 310, and the actuator 30 is constrained by the locking hook 322 of the ramp member 320. In this state, when the hard disc drive 111 starts to be driven, power is applied to the electromagnet 311 through a circuit unit (not shown) to have identical polarity to the permanent magnet 321.

Figure 5A:
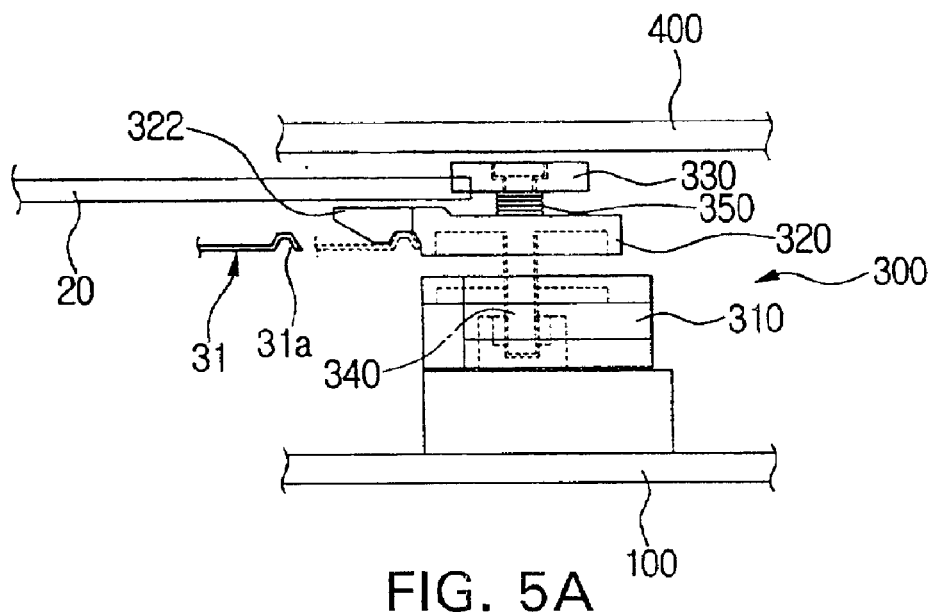
FIG. 5A is a schematic front view illustrating the actuator loading/unloading device shown in the loading operation in accordance with another embodiment of the present invention.
Figure 5B:
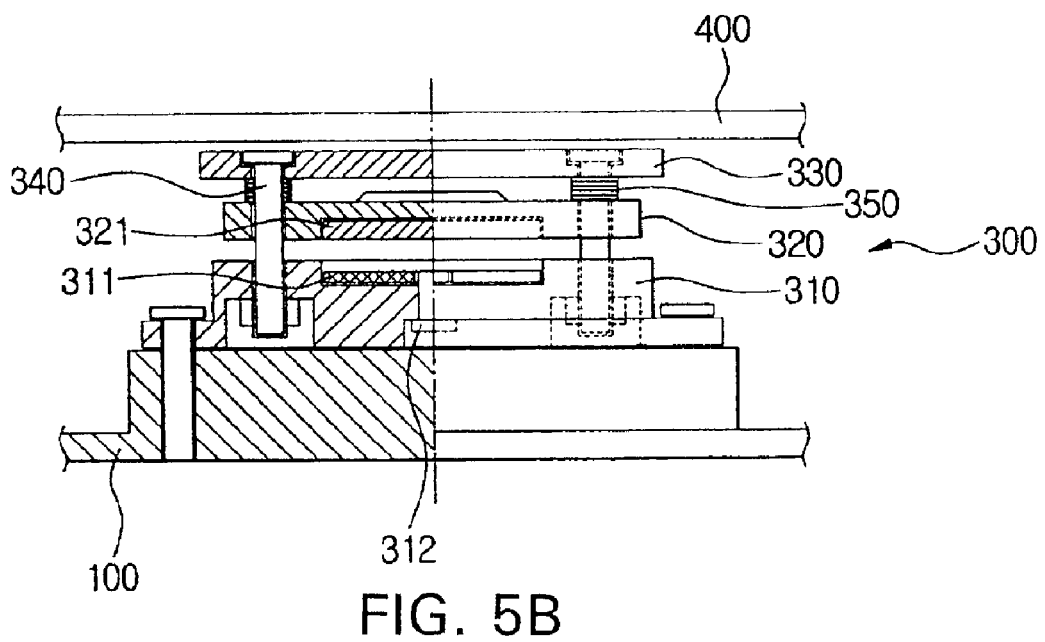
FIG. 5B is a schematic side view illustrating the actuator loading/unloading device shown in FIG. 5A.

When the permanent magnet 321 and the electromagnet 311 have the identical polarity, a repulsive force is generated therebetween. As depicted in FIGS. 5A and 5B, the ramp member 320 is guided and lifted by the guide rods 340, and thus the compression coil spring 350 is compressed. When the ramp member 320 is lifted to be adjacent to the stopper 330, the actuator 30 is moved by the driving of the voice coil motor 120, escaped from the locking hook 322 of the ramp member 320, and loaded in an inner radial direction of the disc 20 rotated at a high speed.

Thereafter, the optical head (h') supported by the flexure 32 of the actuator 30 is slightly floated and moved on the recording surface of the disc 20 due to an airflow generated by high speed rotation of the disc 20, thereby reproducing data recorded on the disc 20 or recording new data thereon.

After the actuator 30 is loaded, power applied to the electromagnet 311 is interrupted, and thus the ramp member 320 is lowered toward the block unit 310 due to its own weight, a restoring force of the compression coil spring 350, and a magnetic force between the permanent magnet 321 and the iron strip 312.

When the recording/reproducing operation is finished and the hard disc drive 111 is not driven, the actuator 30 is moved in an outer radial direction of the disc 20, and thus is unloaded. The ramp member 320 is lifted according to the unloading speed of the actuator 30. When the ramp member 320 is completely lifted, as shown in FIGS. 5A and 5B, the protrusion unit 31a of the swing arm 31 is hooked on the locking hook 322 of the ramp member 320, and the ramp member 320 is lowered to constrain the actuator 30, so that the optical units adhered to the actuator 30 and the optical head (h') cannot contact the disc 20.

As described above, when power is not applied to the electromagnet 311, the ramp member 320 can be lowered due to its own weight, the restoring force of the compression coil spring 350, and the magnetic force between the permanent magnet 321 and the iron strip 312. In addition, when the circuit unit changes a current direction of the electromagnet 311 so that the permanent magnet 321 and the electromagnet 311 have different polarities, a generated attractive force can lower the ramp member 320.

As discussed earlier, in accordance with the present invention, the ramp member 320 is lifted or lowered, constraining the actuator 30. As a result, although the actuator 30 is not completely escaped from the disc 20 during the unloading operation, the actuator 30 can be sufficiently separated from the disc 20. Accordingly, a parking state of the actuator 30 is so stabilized that the actuator 30 cannot contact the disc 20. In addition, the ramp member 320 is fixed to the block unit 310, constraining the actuator 30 due to an attractive force between the permanent magnet 321 and the iron strip 312, and the elastic restoring force of the spring 350. Therefore, when power is not applied to the disc drive 111, the actuator 30 does not contact the disc 20 due to an external vibration or impact.

Moreover, the actuator 30 does not need to be completely escaped from the disc 20 in the unloading operation, thus allowing for a compact structure of the disc drive 111. In particular, the loading and unloading operations of the actuator 30 are stabilized in the disc drive 111 using the optical recording/reproducing method.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A device to load/unload an actuator to/from a disc received by a disc drive, comprising:

a block unit disposed at a base of the disc drive positioned outside the disc;

a ramp member positioned on the block unit, the ramp member being lifted from and lowered on the block unit to selectively contact the block unit, the ramp member parking the actuator by constraining a side end portion of a swing arm of the actuator during the loading/unloading of the actuator;

a stopper to restrict a lifting range of the ramp member; and a lifting/lowering unit to lift and lower the ramp member between the block unit and the stopper.

2. The device according to claim 1, wherein the lifting/lowering unit comprises:

a magnet on a bottom surface of the ramp member; and an electromagnet on a top surface of the block unit, facing the magnet.

3. The device according to claim 2, further comprising a locking hook protruding toward the disc from the ramp member to constrain the side end portion of the swing arm during the unloading of the actuator.

4. The device according to claim 2, wherein the electromagnet is between the magnet and the disc.

5. A device to load/unload an actuator to/from a disc received by a disc drive, comprising:

a block unit disposed at a base of the disc drive positioned outside the disc;

a ramp member positioned on the block unit, the ramp member being lifted from and lowered on the block unit, the ramp member parking the actuator on the device by constraining a side end portion of a swing arm of the actuator during the loading/unloading of the actuator;

a stopper to restrict a lifting range of the ramp member; and a lifting/lowering unit to lift and lower the ramp member between the block unit and the stopper, comprising:

a magnet inserted into a bottom surface of the ramp member, an electromagnet inserted into a top surface of the block unit, facing the magnet, and a spring positioned between the stopper and the ramp member, to elastically bias the ramp member toward the block unit.

6. A device to load/unload an actuator to/from a disc received by a disc drive, comprising:

a block unit disposed at a base of the disc drive positioned outside the disc;

a ramp member positioned on the block unit, the ramp member being lifted from and lowered on the block unit, the ramp member parking the actuator by constraining a side end portion of a swing arm of the actuator during the loading/unloading of the actuator;

a stopper to restrict a lifting range of the ramp member; and a lifting/lowering unit to lift and lower the ramp member between the block unit and the stopper, comprising:

a magnet inserted into a bottom surface of the ramp member, an electromagnet inserted into a top surface of the block unit, facing the magnet, and an iron strip passing through a center portion of the electromagnet, and being positioned on the block unit, facing the magnet.

7. A device to load/unload an actuator having a swing arm to/from a disc received by a disc drive, comprising:

a ramp member to constrain a side end portion of the swing arm during loading/unloading of the actuator;

a block unit, the ramp member being lifted from and lowered on the block unit;

a stopper to restrict a movement of the ramp member; and a lifting/lowering unit to lift and lower the ramp member between the block unit and the stopper, comprising:

a first magnet inserted in the ramp member, a second magnet inserted in the block unit, and an iron strip passing through the second magnet to generate a magnetic force between the first magnet and the iron strip, the magnetic force lowering the ramp member.

8. The device according to claim 7, wherein the lifting/lowering unit further comprises a spring between the stopper and the ramp member, the spring elastically biasing the ramp member toward the block unit.

9. An optical recording/reproducing apparatus to record/reproduce information to/from a disc, comprising:

an actuator comprising a swing arm being loaded/unloaded to/from the disc;

a loader/unloader to load/unload the actuator to/from the disc, the loader/unloader comprising a ramp member to constrain a side end portion of the swing arm during loading/unloading of the actuator;

a block unit, the ramp member being lifted from and lowered on the block unit;

a stopper to restrict a movement of the ramp member; and a lifting/lowering unit to lift and lower the ramp member between the block unit and the stopper, comprising:

a first magnet inserted in the ramp member, a second magnet inserted in the block unit, and an iron strip passing through the second magnet to generate a magnetic force between the first magnet and the iron strip, the magnetic force lowering the ramp member.

10. An optical recording/reproducing apparatus to record/reproduce information to/from a disc, comprising:

an actuator comprising a swing arm being loaded/unloaded to/from the disc;

a loader/unloader to load/unload the actuator to/from the disc, the loader/unloader comprising a ramp member to constrain a side end portion of the swing arm during loading/unloading of the actuator;

a block unit, the ramp member being lifted from and lowered on the block unit;

a stopper to restrict a movement of the ramp member; and a lifting/lowering unit to lift and lower the ramp member between the block unit and the stopper, comprising:
a first magnet inserted in the ramp member,
a second magnet inserted in the block unit, and
a spring between the stopper and the ramp member, the spring elastically biasing the ramp member toward the block unit.

11. A method to load/unload an actuator having a swing arm from a disc with a loader/unloader having a ramp member selectively in contact with a block unit, comprising:

applying power to an electromagnet provided in the block unit to generate a repulsive force between the electromagnet and a second magnet provided in the ramp member, the repulsive force lifting the ramp member to be completely removed from the block unit and to constrain a side end portion of the swing arm; and removing the power to the electromagnet in a power-off state to generate an attractive force between the electromagnet and the second magnet, the attractive force lowering the ramp member to contact the block unit.

12. The method according to claim 11, wherein the actuator does not contact the disc in the power-off state.

* * * * *

UNITED STATES PATENT AND TRADEMARK OFFICE
CERTIFICATE OF CORRECTION

PATENT NO. : 6,958,891 B2
DATED : October 25, 2005
INVENTOR(S) : Byoung-young Bae et al.

It is certified that error appears in the above-identified patent and that said Letters Patent is hereby corrected as shown below:

<u>Title page,</u>
Item [57], ABSTRACT,
Lines 3, 4, 8, 9 and 12, change "lamp" to -- ramp --.

Signed and Sealed this

Thirty-first Day of January, 2006

JON W. DUDAS
*Director of the United States Patent and Trademark Office*